US012716993B2

(12) United States Patent
Bury

(10) Patent No.: US 12,716,993 B2
(45) Date of Patent: Aug. 25, 2026

(54) RADAR TRANSMISSION AND SIGNAL PROCESSING TECHNIQUES USING CHIRP SLOPE VARIATION

(71) Applicant: NXP B.V., Eindhoven (NL)

(72) Inventor: Andreas Gerhard Bury, Dresden (DE)

(73) Assignee: NXP B.V., Eindhoven (NL)

(*) Notice: Subject to any disclaimer, the term of this patent is extended or adjusted under 35 U.S.C. 154(b) by 280 days.

(21) Appl. No.: 18/545,024

(22) Filed: Dec. 19, 2023

(65) Prior Publication Data

US 2025/0199117 A1 Jun. 19, 2025

(51) Int. Cl.
*G01S 7/35* (2006.01)
*G01S 13/58* (2006.01)

(52) U.S. Cl.
CPC ................ *G01S 7/35* (2013.01); *G01S 7/354* (2013.01); *G01S 13/584* (2013.01)

(58) Field of Classification Search
CPC ..... G01S 13/343; G01S 13/347; G01S 13/345
USPC .......................................................... 342/129
See application file for complete search history.

(56) References Cited

U.S. PATENT DOCUMENTS 5,309,378 A * 5/1994 Beierle ............... G01M 13/028 708/322
9,024,809 B2 * 5/2015 Testar ................... G01S 13/343 342/128
9,759,808 B2 * 9/2017 Nayyar ................. G01S 13/282
10,436,888 B2 * 10/2019 Li ......................... G01S 13/886
11,047,974 B1 * 6/2021 Hong ...................... G01S 13/68
11,550,027 B2 * 1/2023 Laghezza .............. G01S 13/343
11,585,889 B2 * 2/2023 Gulati ..................... G01S 7/023
11,994,578 B2 * 5/2024 Hong ..................... G01S 13/584
12,248,052 B2 * 3/2025 Chang ................. G01S 13/4454
12,408,068 B2 * 9/2025 Zhang ..................... G01S 7/023
2011/0122014 A1 * 5/2011 Szajnowski ............ G01S 7/023 342/109
2012/0235854 A1 * 9/2012 Testar ................... G01S 13/343 342/109
2017/0139036 A1 * 5/2017 Nayyar ................. G01S 13/343
2019/0195984 A1 * 6/2019 Goda .................... G01S 13/931

(Continued)

FOREIGN PATENT DOCUMENTS

KR 20230129793 A * 9/2023 ........... G01S 13/931
WO 2023002870 A1 1/2023

OTHER PUBLICATIONS

Li, Ping et al.; "FFBV Algorithm Design for Soft Synchronization FMCW Radar"; IEEE Transactions on Instrumentation and Measurement vol. 70; Publication Date: Feb. 25, 2021; DOI: 10.1109/TIM.2021.3059319.

(Continued)

*Primary Examiner* — Michael W Justice

(57) ABSTRACT

A method includes generating a plurality of chirps to be transmitted in a radar frame of a radar signal. Each chirp of the plurality of chirps has a corresponding chirp slope, and chirp slopes of a first subset of the plurality of chirps monotonically vary from a first chirp of the first subset to a last chirp of the first subset. The method also includes transmitting the plurality of chirps during a radar frame in a radar signal. After receiving the reflection of the radar signal, the method includes processing the received radar signal based on parameters associated with the generated plurality of chirps with the different chirp slopes.

20 Claims, 8 Drawing Sheets

(56) References Cited

U.S. PATENT DOCUMENTS

| | | | | |
|---|---|---|---|---|
| 2020/0033442 | A1* | 1/2020 | Gulati | G01S 7/0234 |
| 2021/0181330 | A1* | 6/2021 | Hong | G01S 13/42 |
| 2021/0270951 | A1* | 9/2021 | Yoshizawa | H04W 72/12 |
| 2022/0095151 | A1* | 3/2022 | Zhang | G01S 7/023 |
| 2022/0099820 | A1* | 3/2022 | Hong | G01S 7/354 |
| 2022/0308204 | A1* | 9/2022 | Zaidi | G01S 13/426 |
| 2023/0104935 | A1* | 4/2023 | Chang | G01S 7/415 342/128 |
| 2023/0280461 | A1* | 9/2023 | Kim | G01S 13/89 342/175 |
| 2024/0310478 | A1* | 9/2024 | Sahara | G01S 13/343 |
| 2024/0377504 | A1* | 11/2024 | Jansen | G01S 13/878 |

OTHER PUBLICATIONS

Amar, R. et al., "Optimized-Slope FMCW Waveform for Automotive Radars", 2022 23rd International Radar Symposium, Gdansk, Poland; 2022; pp. 110-115.

Bidon, S. et al., "Fast Coherent Integration for Migrating Targets with Velocity Ambiguity", 2011 IEEE RadarCon (Radar), May 23-27, 2011; pp. 27-32.

Bourdoux, A. et al., "Near-optimal Range Migration and Doppler Ambiguity Compensation for FMCW Radars", 2022 IEEE Radar Conference, Mar. 21-25, 2022; 6 pages.

Jing, L. et al., "A Fast Range Migration Compensation Method", 2010 2nd International Conference on Signal Processing Systems, Jul. 5-7, 2010; 5 pages.

Nagano, T. et al., "Range Migration Compensation for Moving Targets with Unknown Constant Velocity in Chirp Radars", Proceedings of the 8th European Radar Conference, Oct. 12-14, 2011; 4 pages.

Perry, R.P. et al., "SAR Imaging of Moving Targets", IEEE Transactions on Aerospace and Electronic Systems, vol. 35, No. 1; Jan. 1999; 13 pages.

Richards, M.A. et al., "The Keystone Transformation for Correcting Range Migration in Range-Doppler Processing", <<https://radarsp.weebly.com/uploads/2/1/4/7/21471216/keystone_commutative.pdf>>; Mar. 2014; 32 pages.

Roos, F. et al., "Range Migration Compensation for Chirp-Sequence Based Radar", 2016 German Microwave Conference (GeMiC), Mar. 14-16, 2016; 4 pages.

Van Dorp, P., "LFMCW based MIMO imaging processing with Keystone Transform", IEEE Proceedings of the 43rd European Microwave Conference; Oct. 7-10, 2013; Nuremberg, Germany; pp. 1779-1782.

Xu, L. et al., "Doppler-Range Processing for Enhanced High-Speed Moving Target Detection Using LFMCW Automotive Radar", IEEE Transactions on Aerospace and Electronic Systems, vol. 58, No. 1; Feb. 2022; pp. 568-580.

* cited by examiner

RADAR TRANSMISSION AND SIGNAL PROCESSING TECHNIQUES USING CHIRP SLOPE VARIATION

BACKGROUND

Many applications rely on radar to provide accurate information of the surrounding environment. For example, modern vehicles employ radar to implement Advanced Driving Assistance Systems (ADAS) and Autonomous Driving (AD) that perform functions such as adaptive cruise control, automated steering, and emergency braking. In some cases, vehicular radar systems use radar modulation schemes (e.g., Frequency Modulated Continuous Waveform (FMCW) radar) that modulate the frequency of a radar signal in sequences commonly referred to as radar chirps, or chirps for short, in the 76 Gigahertz (GHz) to 81 GHz frequency band. Radar systems using these types of radar modulation schemes sense the surrounding environment by transmitting the sequence of chirps in a radar signal, receiving reflections of the chirps after they reflect off of one or more objects, and processing the received reflections to obtain a range profile of the one or more objects as well as the velocities of the objects. In order to provide a more robust and accurate perception of the surrounding environment, radar systems implement various transmission and signal processing methods.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
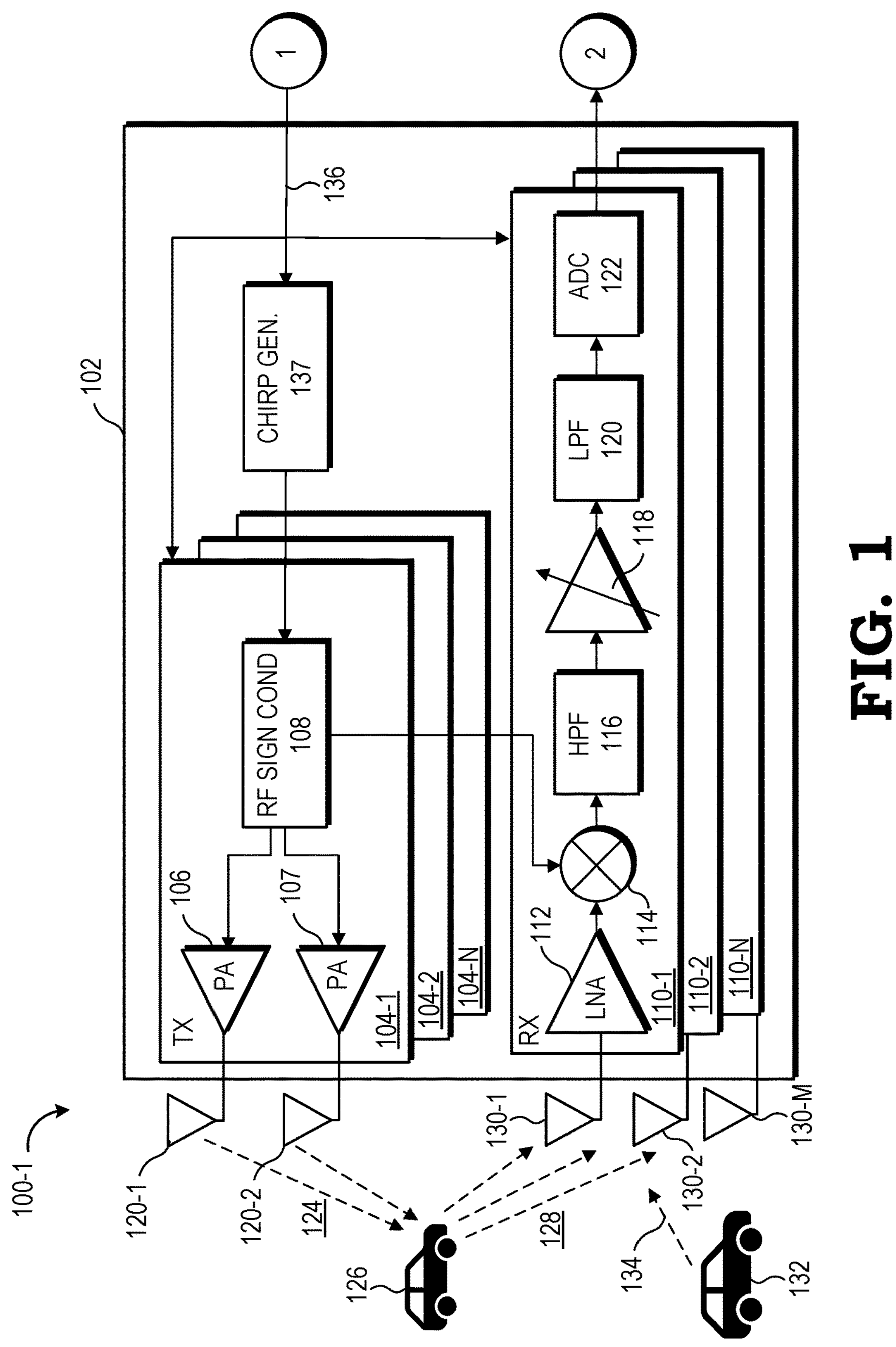
FIGS. 1 and 2 show examples of a radar front end and a radar master controller processing unit, respectively, in a radar system to implement radar transmission and signal processing techniques in accordance with various embodiments.

A radar system employing an FMCW modulation scheme utilizes a chirp generator to generate a sequence of chirps that are included in the radar signal that is transmitted to the surrounding environment. The radar system also feeds the sequence of chirps to a mixer in a receiver of the radar system, where the sequence of chirps is mixed with a received reflection of the radar signal to generate a beat frequency that is indicative of the propagation delay between the transmitted radar signal and the received reflection. This propagation delay is used to determine a range profile of a reflecting object in the surrounding environment. In addition, the radar system detects a change in the received phase across multiple range profiles that are generated for the sequence of chirps to determine the relative velocity between the reflecting object and the radar system. Conventional chirp generators generate the sequence of chirps with a common chirp slope. That is, each one of the chirps of the sequence of chirps generated by conventional radar systems has the same chirp slope, where the chirp slope is defined as a change in frequency (e.g., frequency ramp-up) over a chirp duration. Conventional radar systems are susceptible to "range migration" that occurs when the propagation delay changes rapidly due to changes in the distance between the reflecting object and the radar system. "Range migration" blurs the range and velocity data, which in turn degrades the accuracy and sensitivity of the radar system. For example, a blurred range and velocity data point associated with one object in the surrounding environment may obscure the range and velocity point of another object in the surrounding environment, thereby reducing the visibility of the other object from the radar system's perspective. FIGS. 1-10 provide radar signal transmission techniques that modulate the chirp slope of the sequence of chirps in a transmitted radar signal and corresponding signal processing techniques to increase the accuracy and sensitivity of the radar system, especially in scenarios that are more susceptible to "range migration," e.g., high velocity situations.

To illustrate, in some embodiments, a chirp generator of a radar system generates a radar chirp sequence having a plurality of chirps. Each one of the chirps has a transmission frequency that varies linearly from a minimum frequency value to a maximum frequency value (i.e., varies linearly over a fixed chirp bandwidth) during a duration of the respective radar chirp, and at least one chirp of the plurality of chirps has a different chirp slope than at least one other chirp of the plurality of chirps. For example, the chirp covers a similar chirp frequency range but has a different chirp duration compared to other chirps of the plurality of chirps. The radar system also includes one or more transmit antennas to transmit the radar chirp sequence during a radar frame of a transmitted radar signal, and the transmission of the radar chirp sequence is repeated during subsequent radar frames of the transmitted radar signal. Thus, each one of the transmitted radar frames includes a radar chirp sequence having the plurality of chirps, and one or more of the plurality of chirps within a respective radar frame has a different chirp slope than other ones of the plurality of chirps of the respective radar frame. As a result, the received reflection of the transmitted radar signal includes the radar frames that have a plurality of chirps with different chirp slopes, albeit at an offset with respect to the transmitted signal due to the propagation delay attributed to the round trip of the radar signal from the radar system to the reflecting object. By varying the chirp slope across the plurality of chirps of a radar frame, the "range migration" in the generated range-Doppler maps is reduced or eliminated, thereby increasing the accuracy and sensitivity of the radar system.

In some embodiments, any of the elements, components, or blocks shown in the ensuing figures are implemented as one of software executing on a processor, hardware that is hard-wired (e.g., circuitry) to perform the various operations described herein, or a combination thereof. For example, one or more of the described blocks or components (e.g., blocks or components associated with chirp slope control of the generated plurality of chirps in the transmitted signal, blocks or components associated with radar signal processing, or the like) represent software instructions that are executed by hardware such as a digital signal processor, an application-specific integrated circuit (ASIC), a set of logic gates, a field programmable gate array (FPGA), programmable logic device (PLD), a hardware accelerator, a parallel processor, or any other type of hardcoded or programmable circuit. As another example, one or more of the described blocks or components (e.g., blocks or components associated with chirp slope control of a radar signal for transmission) represent hardware in the chirp generator such as a chirp slope control circuitry or the like.

Figure 2:
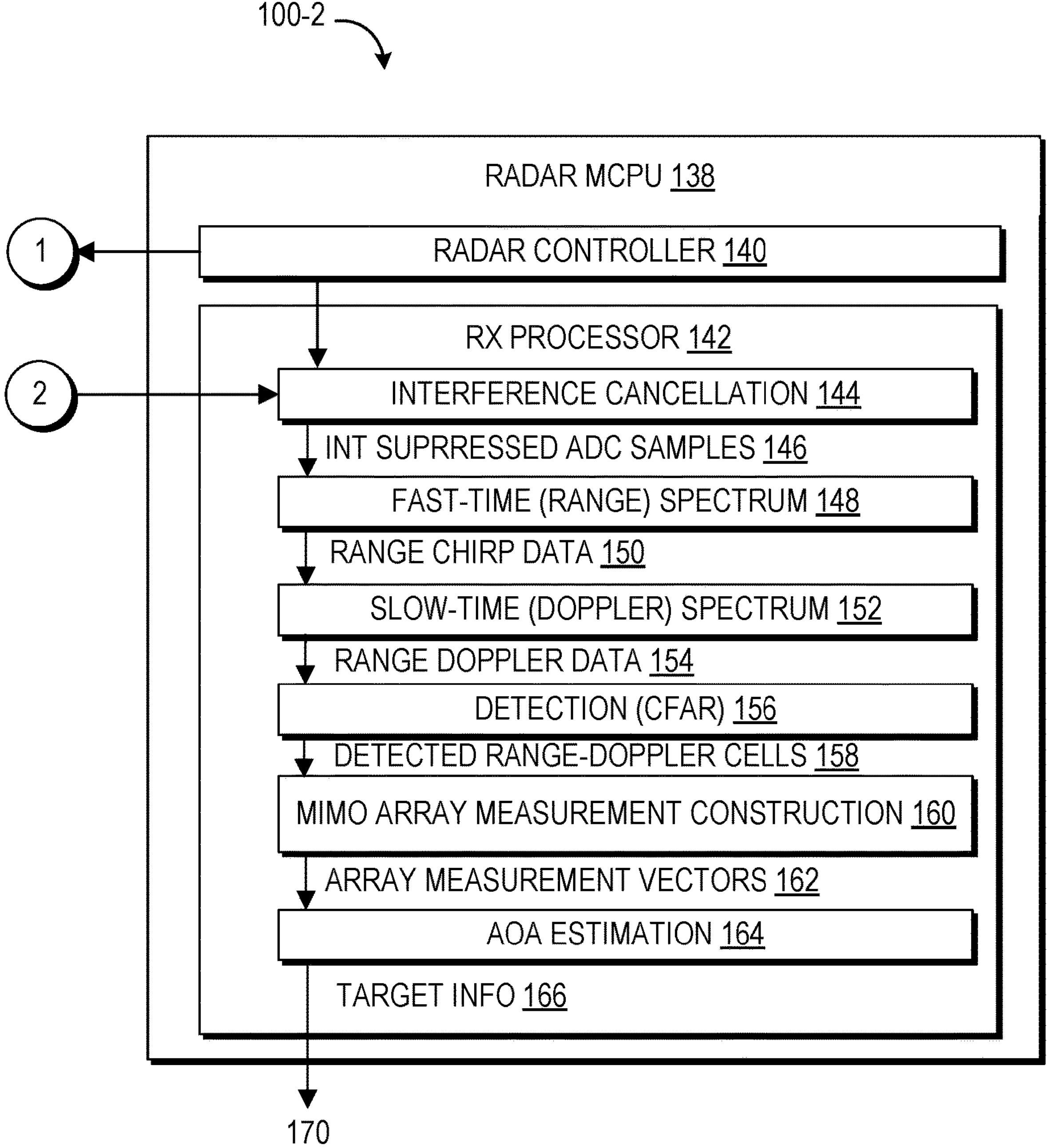

FIGS. 1 and 2 show an example of a radar system 100 (including a first radar system section 100-1 of FIG. 1 and a second radar system section 100-2 of FIG. 2) that implements the radar chirp slope control and signal processing techniques described herein in accordance with at least one embodiment. FIG. 1 shows a radar front end 102 of the radar system 100 and FIG. 2 shows a radar master controller processing unit (MCPU) 138 of the radar system 100.

Referring to FIG. 1, in some embodiments, the radar front end 102 includes multiple transmitters 104-1 to 104-N (collectively referred to as transmitters 104). In some embodiments, each transmitter 104 includes a plurality of power amplifiers (Pas) 106, 107 and a radio frequency (RF) conditioning (cond.) component 108. The PAs 106, 107 convert a lower power RF signal into a higher power RF signal prior to transmission. For example, in some embodiments, the PAs 106, 107 are configured to convert a lower power RF signal including a plurality of chirps into a higher power RF signal. The RF conditioning component 108 includes hardware and/or software for modifying (i.e., conditioning) the signal received from the chirp generator 137 prior to providing it to the PA 106. For example, in some embodiments, the RF conditioning component 108 includes one or more filters that filter the RF signals prior to signal power amplification at PAs 106, 107, and/or one or more phase modulators that modulate a phase of the signal prior to signal power amplification at one of PAs 106, 107, or the like.

In some embodiments, the radar front end 102 receives program, control trigger, and reference clock signals 136 that are utilized for chirp generation at a chirp generator 137 or received signal processing in the receivers 110. For example, the reference clock signal is a local oscillator (LO) signal, and the control trigger is a chirp start trigger signal that are input to the chirp generator 137 to generate radar chirp sequences that are further processed (e.g., by RF conditioning component 108 and PAs 106, 107) before being transmitted by the transmit antennas 120 of the radar front end 102. In some embodiments, the chirp generator 137 includes a phase locked loop (PLL) that generates linear frequency modulated chirp sequences. For example, the PLL in the chirp generator 137 generates an FMCW chirp sequence for transmission by the transmitters 104. As described herein, in some embodiments, the chirp generator 137 includes a chirp slope controller configured to generate a plurality of chirps for transmission, wherein a chirp slope of each chirp of the plurality of chirps is different from a chirp slope of other chirps of the plurality of chirps. In some embodiments, the chirp slope is defined as a change in chirp frequency over a change in chirp duration of each chirp of the plurality of chirps.

The radar front end 102 also includes transmission antennas 120. In some embodiments, each transmitter 104 is configured with its own transmission antennas 120 (e.g., transmitter 104-1 with transmission antennas 120-1, 120-2). Transmitters 104 send transmitted signals 124 toward one or more targets 126 (one labeled for clarity). The transmitted signals are reflected from the target 126, and the target reflected signals 128 (collectively referred to as target radar signal, radar reflections, or the like) are directed back to the radar system 100. The target reflected signals 128 are received by reception antennas 130-1 to 130-M. In some embodiments, each receiver 110 is configured with its own reception antenna 130 (e.g., receiver 110-1 with reception antenna 130-1, receiver 110-2 with reception antenna 130-2, receiver 110-M with reception antenna 130-M). Along with receiving the target reflect signals 128, the receivers 110 may receive other unwanted signals. For example, an interferer 132 (in this example, radar signals from another vehicle) transmits interference 134 which is also received by the receivers 110.

As indicated earlier, the radar front end 102 also includes multiple receivers 110-1 to 110-M (collectively referred to as receivers 110). One or more of the receivers 110 includes a low noise amplifier (LNA) 112, a deramp mixer 114, a high pass filter (HPF) 116, a variable gain amplifier 118, a low pass filter (LPF) 120, and an analog-to-digital converter (ADC) 122 that digitizes the received radar signal prior to providing it to a radar signal processor for estimating a range and velocity of the targets 126. By including multiple transmitters 104 and multiple receivers 110, the radar system 100 is able to implement a multiple-input multiple-output (MIMO) radar modulation scheme where multiple transmission (TX) elements are used to create a larger virtual array of reception (RX) elements to increase the angular resolution of the radar system.

Referring now to FIG. 2, in some embodiments, the radar system 100 includes a radar master controller processing unit (MCPU) 138. In some embodiments, the radar MCPU 138 includes a radar controller 140 and a receiver (RX) processor 142. The radar controller 140 provides the program, control trigger, and reference clock signals 136 as described above. The receiver processor 140 receives the digitized signals from the radar front end 102, e.g., from the ADCs 122 of the receivers 110. In some embodiments, the RX processor 140 includes an interference cancellation component 144, which provides the interference suppressed ADC samples 146. A fast-time (Range) spectrum component 148 receives and processes the interference suppressed ADC samples 146. For example, the fast-time spectrum component 148 applies an FFT over the fast-time index of the windowed samples to provide range chirp data 150 indicative of chirp reflections received at the reception antennas 130. In some embodiments, the range chirp data 150 is cubed with an x-axis and a y-axis made up of fast time data and a z-axis representing data for each of the reception antennas 130. The range chirp data 150 is received and processed by a slow-time (velocity or Doppler) spectrum component 152. For example, the slow-time spectrum component 152 applies an FFT over the slow-time index of the windowed samples. In this manner, the slow-time spectrum component 152 provides range-Doppler data 154 (also referred to as a range-Doppler map) for each of the reception antennas 130. In some embodiments, the range Doppler data 154 is received and processed by a constant false alarm rate (CFAR) detection component 156. The detection component 156 provides detected range and Doppler cell data 158. A MIMO array measurement construction component 160 receives and processes the detected range and Doppler cell data 158. The MIMO array measurement construction component 160 provides a plurality of array measurement vectors 162. Each array measurement vector is received and processed by a target Angle of Arrival (AoA) estimation component 164. The target AoA estimation component 164 provides target information 166 attributed to the target 126 detected by radar system 100 to other components via data interface 170. For example, the other components include software modules executed by a processor to implement advanced driver assistant system (ADAS) or autonomous driving (AD) perception and vehicular control systems.

In some embodiments, the radar system 100, including the radar front end 102 and the radar MCPU 138 are configured to implement the radar chirp slope control and corresponding signal processing techniques described herein. For example, the chirp generator 137 includes a chirp slope control component in order to generate a plurality of chirps with different chirp slopes for transmission as described herein. The receivers 110 and the radar MCPU 138 include filtering, sampling, and processing components to account for the varying chirp slopes in the received reflections of the radar frames to perform range and velocity (Doppler) processing. By implementing the variable chirp control techniques described herein, the accuracy and sensitivity of the radar system 100 is improved for targets moving at high radial velocity relative to the radar system 100.

Figure 3:
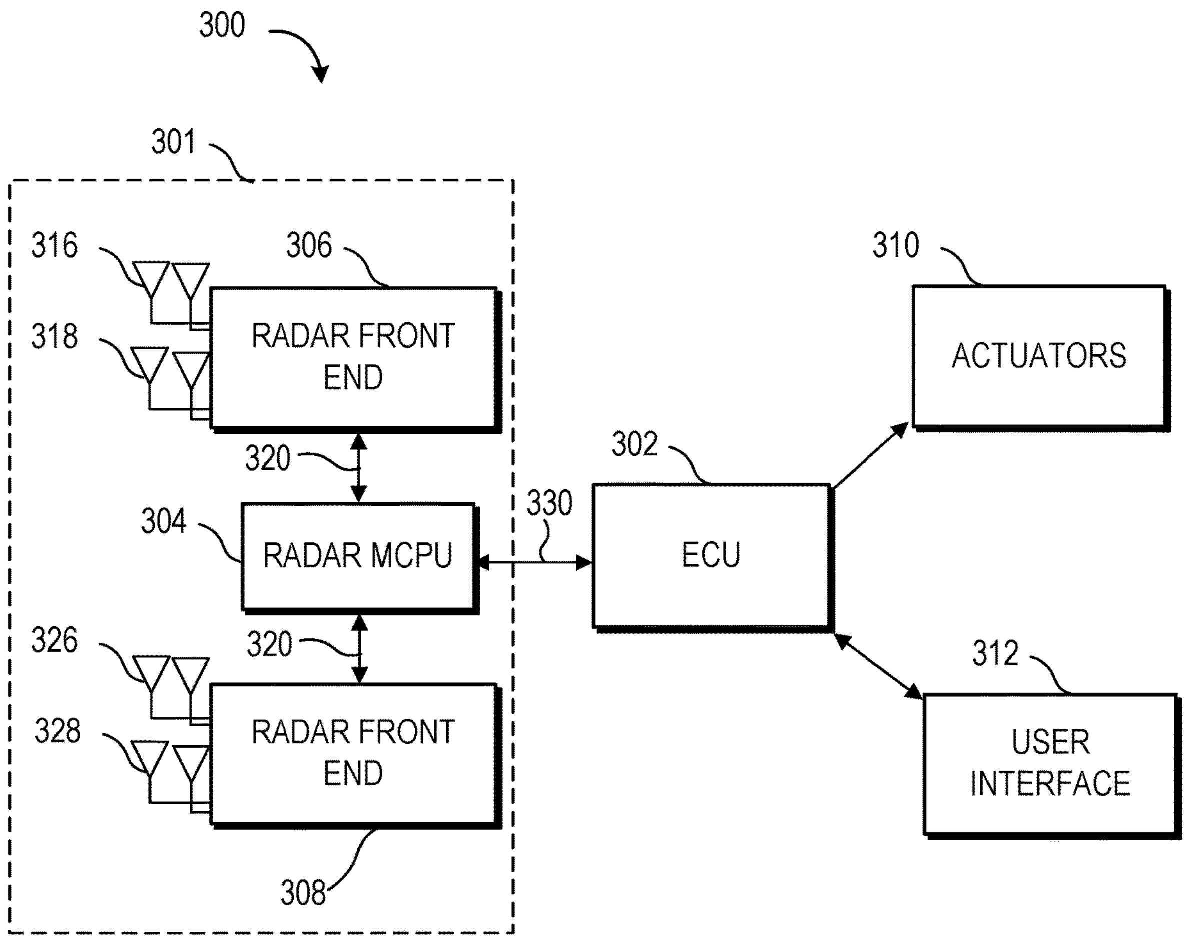
FIG. 3 shows an example of a vehicular control system including a radar system, such as the radar system of FIGS. 1 and 2, in accordance with various embodiments.

FIG. 3 shows an example of a vehicular control system 300 in accordance with some embodiments. The vehicular control system 300 is implemented, for example, in an automobile to assist in driver-assistance or autonomous driving functions or in a drone to perform object avoidance or other functions. As illustrated, the vehicular control system 300 includes a radar system 301 which includes radar front ends 306, 308 and a radar MCPU 304. In some embodiments, radar front ends 306, 308 correspond to radar front end 102 in FIG. 1 and radar MCPU 304 corresponds to radar MCPU 138 in FIG. 2.

In some embodiments, the vehicular control system 300 includes an electronic control unit (ECU) 302. The ECU 302 includes processing circuitry, e.g., a central processing unit (CPU), to perform various processing functions related to vehicular control. The radar MCPU 304 is coupled to radar front ends 306, 308 via interfaces 320 and to the ECU 302 via interface 330. While two radar front ends 306, 308, are shown in FIG. 3, this number is for clarity purposes and may be scalable to a larger quantity. In some embodiments, the radar front ends 306, 308 are located at various positions around an automobile housing vehicular control system 300. For example, one radar front end 306 is positioned at the front end of the automobile and the other radar front end 308 is positioned at the rear end of the automobile. In some embodiments, radar front end 306 includes a plurality of antennas 316, 318. For example, plurality of antennas 316 are transmission antennas and plurality of antennas 318 are reception antennas. Similarly, in some embodiments for radar front end 308, the plurality of antennas 326 are transmission antennas and the plurality of antennas 328 are reception antennas. In some embodiments, the plurality of antennas associated with each of radar front ends 306, 308 support MIMO radar configurations. While two antennas are shown for each of the plurality of antennas 316, 318, 326, 328, this number is for clarity purposes and may be scalable to larger quantities (e.g., three, four, or more antennas) in some embodiments.

In some embodiments, the radar MCPU 304 is implemented as a micro-controller unit (MCU) or other processing unit that is configured to execute radar signal processing tasks such as, but not limited to, object identification, computation of object distance, object velocity, and object direction (collectively referred to as "radar information"). In some embodiments, the radar MCPU 304 is additionally configured to generate control signals based on the radar information. The radar MCPU 304 is, for example, configured to generate calibration signals, receive data signals, receive sensor signals, generate frequency spectrum shaping signals (such as signals associated with the FCMW radar techniques described herein) and/or state machine signals for radio frequency (RF) circuit enablement sequences. In addition, in some embodiments, the radar MCPU 304 is configured to program the radar front ends 306, 308 to operate in a coordinated fashion by transmitting MIMO waveforms for use in constructing a virtual aperture from a combination of the distributed apertures formed by the plurality of transmission and reception antennas shown in FIG. 3.

The radar front ends 306, 308, in some embodiments, include radar front end chip circuitry that is coupled to the respective pluralities of antennas to transmit radar signals (e.g., in the form of radar chirp sequences), to receive reflected radar signals, and to digitize these received radar signals for forwarding to the radar MCPU 304 over interface 320. In some embodiments, the radar MCPU 304 performs radar processing tasks based on the digitized radar signals received from the radar front ends 306, 308 to provide radar information to the ECU 302. The ECU 302 uses this radar information to control one or more actuators 310 such as a steering actuator, braking actuator, or throttle actuator to assist in driver-assistance or autonomous driving functions. In some embodiments, the ECU 302 displays the radar information or associated information via a user interface 312 such as a screen display, a speaker, or a light (e.g., in a side mirror or on a dashboard) to alert the driver of nearby objects.

Figure 4:
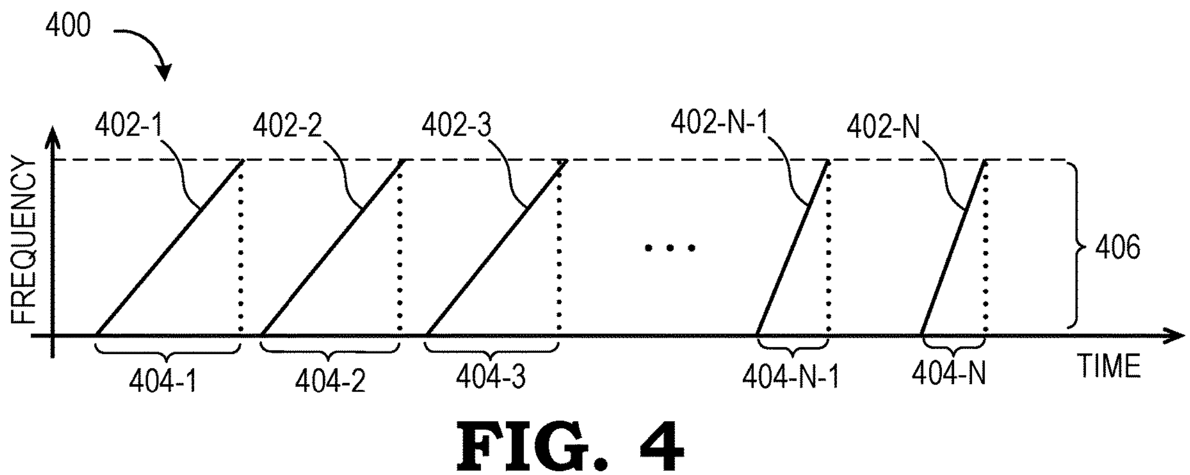
FIGS. 4-6 show examples of radar frames having a plurality of chirps with different chirp slopes, in accordance with various embodiments.
Figure 5:
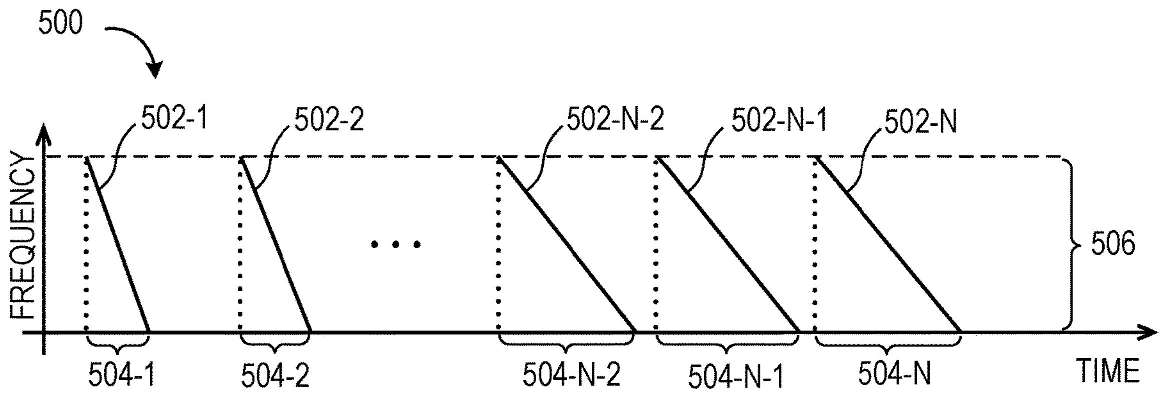
Figure 6:
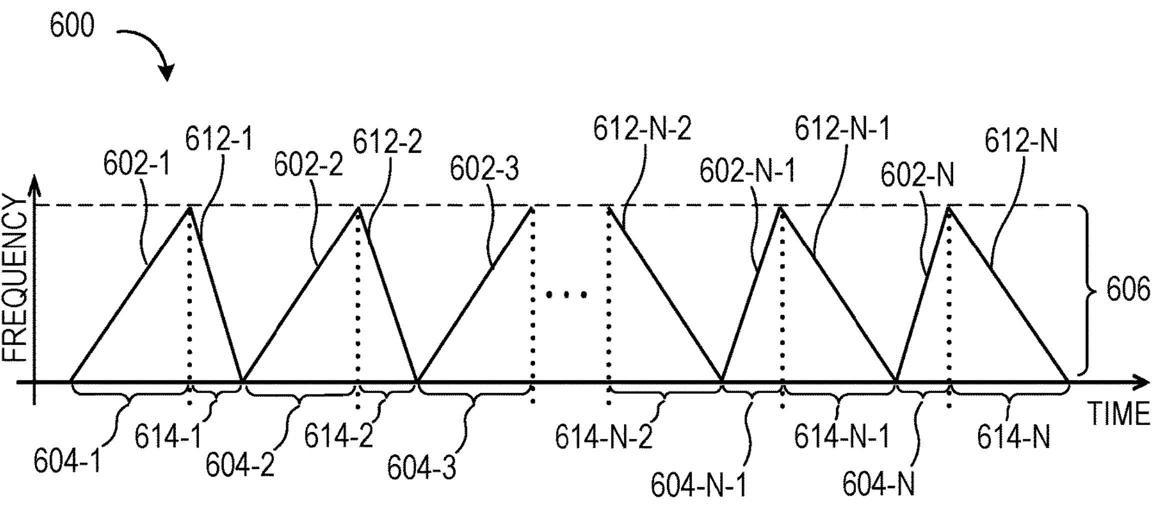

FIGS. 4-6 illustrate examples of radar sequences 400, 500, 600 in accordance with various embodiments. Each one of the radar sequences 400, 500, 600 includes a respective plurality of chirps with chirp slopes that vary across the respective radar sequence. In each one of radar sequences 400, 500, 600, the plurality of chirps in the respective radar sequence includes at least a first subset of chirps whose chirp slopes monotonically vary from a first chirp in the first subset to a last chirp in the first subset. For radar sequences 400, 500, the plurality of chirps in the radar sequence is equivalent to the first subset. In radar sequence 600, the plurality of chirps includes a second subset of chirps different from the first subset of chirps, where the second subset of chirps includes chirps whose chirp slopes monotonically vary from a first chirp in the second subset to a last chirp of the second subset, albeit the variation of the chirp slopes in the second subset is different than the variation of the chirp slopes in the first subset. Thus, each one of radar sequences 400, 500, 600 includes radar chirps with chirp slopes that monotonically vary across the duration of the respective radar sequence 400, 500, 600. A chirp generator of a radar system, such as chirp generator 137 of FIG. 1, includes a chirp slope controller (e.g., chirp slope controller 802 and 902 illustrated in FIGS. 8 and 9, respectively) to generate the radar sequences 400, 500, 600. As used herein, the chirp slope of a respective chirp is defined as a change in frequency of the chirp over a duration, or time, of the chirp. In addition, the term "monotonically vary" with respect to the chirp slopes means that the chirp slopes either monotonically increase or monotonically decrease over the plurality of chirps (or, with respect to FIG. 6, a subset of the plurality of chirps). For example, for positive chirp slopes, the chirp slopes monotonically increase if the chirp slopes increase in value from the first chirp to the last chirp in the plurality of chirps (or, with respect to FIG. 6, a subset of the plurality of chirps), where consecutive chirps within the plurality of chirps have chirp slopes that either increase in value or remain constant. Similarly, for negative chirp slopes, the absolute values of the chirp slopes monotonically decrease if the absolute values of the chirp slopes decrease in magnitude from the first chirp to the last chirp in the plurality of chirps (or, with respect to FIG. 6, a subset of the plurality of chirps), where consecutive chirps within the plurality of chirps have chirp slopes whose absolute value either decreases in value or remains constant.

Referring to FIG. 4, radar sequence 400 includes a plurality of chirps 402-1 to 402-N (where N is an integer greater than 4 in the illustrated embodiment) with positive chirp slopes. The plurality of chirps 402-1 to 402-N are transmitted over frequency bandwidth 406. For example, frequency bandwidth 406 includes frequencies ranging from 76 GHz to 81 GHz, e.g., frequency bandwidth 406 can be 1 GHz ranging from 76 GHz to 77 GHz, frequency bandwidth 406 can be 2 GHz ranging from 79 GHz to 81 GHz, or the like. The plurality of chirps 402-1 to 402-N start off at a similar minimum frequency value and ramp up to a similar maximum frequency value over the frequency bandwidth 406. The plurality of chirps 402-1 to 402-N each have a different respective duration 404-1 to 404-N compared to other ones of the plurality of chirps 402-1 to 402-N. Thus, each one of the plurality of chirps 402-1 to 402-N has a different chirp slope. For example, the first chirp 402-1 of the plurality of chirps in the radar sequence 400 has a longer duration of 404-1 over which the frequency of the signal ramps up over frequency bandwidth 406, while the last chirp 402-N has a shorter duration 404-N over which the frequency of the signal ramps up over frequency bandwidth 406. Since the duration of time (or $\Delta t$) of the chirps 402-1 to 402-N decreases while the frequency change (or $\Delta f$) from the minimum frequency value to the maximum frequency value remains constant (i.e., corresponding to frequency bandwidth 406), the magnitude of the positive slope (e.g., $\Delta f/\Delta t$) of the chirps increases from the first chirp 402-1 to the last chirp 402-N in the radar sequence 400. By varying the chirp slope of the chirps in the radar sequence that is included in the radar signal transmitted by the radar system, the reflection of the radar signal received at the radar system includes the reflected chirps with varying chirp slopes as well. Furthermore, the receiver and the signal processor are configured to account for the variable chirp slopes in the received reflections to generate a range-Doppler map that exhibits greater sensitivity and accuracy for targets moving at high radial velocity (i.e., exhibiting range migration) compared to the range-Doppler maps generated by conventional systems employing sequences of chirps with identical chirp slopes.

Referring to FIG. 5, radar sequence 500 includes a plurality of chirps 502-1 to 502-N (where N is an integer greater than 4 in the illustrated embodiment) with negative chirp slopes. The plurality of chirps 502-1 to 502-N are transmitted over frequency bandwidth 506. For example, frequency bandwidth 506 includes frequencies ranging between 76 GHz to 81 GHz. The plurality of chirps 502-1 to 502-N start off at a similar maximum frequency value and ramp down to a similar minimum frequency value over the frequency bandwidth 506. The plurality of chirps 502-1 to 502-N each have a different respective duration 504-1 to 504-N compared to other ones of the plurality of chirps 502-1 to 502-N. Thus, each one of the plurality of chirps 502-1 to 502-N has a different chirp slope. For example, the first chirp 502-1 of the plurality of chirps in the radar sequence 400 has a shorter duration of 504-1 over which the frequency of the signal ramps down over frequency bandwidth 506, while the last chirp 502-N has a longer duration 504-N over which the frequency of the signal ramps down over frequency bandwidth 506. Since the duration of time (or $\Delta t$) of the chirps 502-1 to 502-N increases while the frequency change (or $\Delta f$) from the maximum frequency value to the minimum frequency value remains constant (i.e., corresponding to frequency bandwidth 506), the absolute value of the negative slope (e.g., $\Delta f/\Delta t$) of the chirps decreases from the first chirp 502-1 to the last chirp 502-N in the radar sequence 500. By varying the chirp slope of the chirps in the radar sequence that is included in the radar signal transmitted by the radar system, the reflection of the radar signal received at the radar system includes the reflected chirps with varying chirp slopes as well. Furthermore, the receiver and the signal processor are configured to account for the variable chirp slopes in the received reflections to generate a range-Doppler map that exhibits greater sensitivity and accuracy compared to the range-Doppler maps generated by conventional systems employing sequences of chirps with identical chirp slopes for targets moving at high radial velocity (i.e., exhibiting range migration).

In some embodiments, for either one of the radar sequences 400 and 500 shown in FIGS. 4 and 5, respectively, the radar sequence includes adjacent chirps that have a similar chirp slope (therefore, a similar duration) to support potential limitations in the chirp generation with respect to available chirp slope values. For example, in some embodiments, each pair (or other number) of adjacent chirps in a respective one of the radar sequences 400, 500 may have the same slope chirp value, and the chirp slope values of the adjacent pairs of chirps increase over the duration of the radar sequence 400 or decrease over the duration of radar sequence 500. That is, referring to radar sequence 400, for example, the first chirp 402-1 and the second chirp 402-2 may have a common first chirp slope, and the third chirp 402-3 and the fourth chirp (not shown) may have a common second chirp slope that is greater than the first common chirp slope of the first pair of chirps 402-1, 402-2. Thus, if the number of chirps to be generated by the chirp generator (such as chirp generator 137 of FIG. 1) is greater than the particular number of discrete (quantized) chirp slope values supported by the chirp generator, then the chirp generator is configured to apply one of the particular number of discrete (quantized) chirp slope values to each adjacent set of chirps in the total number of chirps such that the discrete (quantized) chirp slopes are applied over the entire set of chirps in a monotonically increasing or monotonically decreasing manner. For example, if the chirp generator supports 32 chirp slope values and the radar sequence includes 64 chirps, then the chirp generator is configured to apply the same chirp slope value to each set of two adjacent chirps in the radar chirp sequence. In another example, if the chirp generator supports 16 chirp slope values and the radar sequence includes 64 chirps, then the chirp generator is configured to apply the same chirp slope value to each set of four adjacent chirps in the radar chirp sequence. In another example, in some embodiments, the chirp generator supports discrete slope values with equidistant stepping (or spacing). Since the nominal slope values are defined according to a 1/x rule, in the case of positive chirp slopes, the slope quantization constraint implied by the chirp generator may result in a frame with larger number of identical chirp slopes at the beginning of the radar frame and a smaller number of identical chirp slopes (or always distinct chirp slopes) toward the end of the radar frame.

In both of the figures above (i.e., FIGS. 4 and 5), the respective chirp slopes and fast-time sampling rates (or sampling frequencies) of each sequence are derived according to a function such as those described below in FIG. 7. Since a smaller slope is associated with a longer chirp time given the fixed frequency bandwidth, the chirp with the smallest absolute value (i.e., chirp 402-N in radar sequence 400 or chirp 502-1 in radar sequence 500) determines the minimum possible slow-time sampling rate. Given that the slow-time sampling rate (which is directly correlated with the duration of the chirps) is fixed over the duration of an entire radar frame, the idle time between chirps in each of the radar sequences 400, 500 becomes longer between chirps having larger absolute value chirp slopes.

FIG. 6 illustrates an embodiment of a radar sequence 600 with an interleaved format that is transmitted over frequency bandwidth 606, in accordance with various embodiments. In the illustrated embodiment, radar sequence 600 interleaves the radar sequence 400 and radar sequence 500 such that the chirps alternate between having a positive chirp slope 602-1 to 602-N and a negative chirp slope 612-1 to 612-N, where N is the same integer. In some embodiments, the chirps having positive chirp slopes belong to a first subset, and the chirps having negative chirp slopes belong to a second subset. Thus, for example, positive slope chirp 602-1 (corresponding to chirp 402-1 of radar sequence 400) having a chirp duration 604-1 is interleaved with negative slope chirp 612-1 (corresponding to chirp 502-1 of radar sequence 500) having a chirp duration 614-1, and positive slope chirp 602-N (corresponding to chirp 402-N of radar sequence 400) having a chirp duration 604-N is interleaved with negative slope chirp 612-N (corresponding to chirp 502-N of radar sequence 500) having a chirp duration 614-N, while intervening chirps having positive and negative chirp slopes are similarly interleaved within radar sequence 600. In the illustrated embodiment, radar sequence 600 is depicted as starting with a chirp 602-1 having a positive chirp slope. In other embodiments, the radar sequence starts with a chirp having a negative chirp slope, such as chirp 612-1. Interleaving the chirps in this manner is performed by using a slow-time sample period which is long enough to fit one positive slope chirp and one negative slope chirp. Because the duration of the positive slope chirps increases over the radar sequence 600 while the duration of the negative slope chirps decreases, this interleaved format approach enables collecting sensing signal energy during the gaps which would be present in the case of only having positive slope chirps or only having negative slope chirps.

Figure 7:
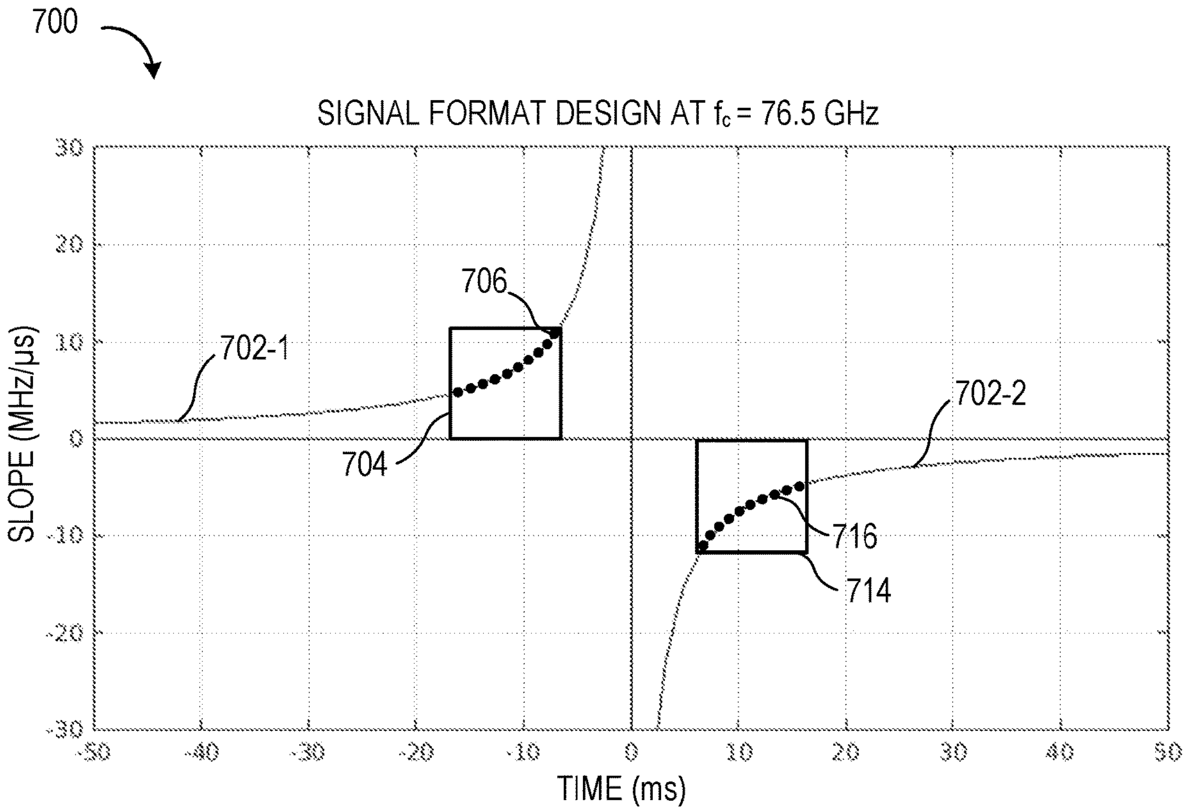
FIG. 7 shows an example of a graph illustrating parameters that a chirp generator utilizes to generate the different chirp slopes of the plurality of chirps, in accordance with various embodiments.

FIG. 7 shows a graph 700 depicting examples of a function that are employed by a chirp slope controller in a chirp generator to determine the different chirp slopes and according fast-time sampling rates (or sampling frequencies) for a plurality of chirps in accordance with various embodiments. The illustrated embodiment shows a signal format design with a frequency center at 76.5 GHz (i.e., center frequency ($f_c$)=76.5 GHz). In alternative embodiments, the frequency is centered about another frequency value (e.g., in automotive applications, the center frequency value is within the range of 76 GHz to 81 GHz). The y-axis of graph 700 shows the chirp slope (in MHz/μs) and the x-axis shows the time axis within the radio frame (in milliseconds, ms), defined for a particular radar frame duration (10 ms in the examples shown) and for a particular maximum absolute slope value (about 11 MHz/μs in the examples shown). The fast-time sampling frequencies are configured along with the respective chirp slopes according to an equation which is represented as "sampling_frequency=chirp_slope*4*maximum_range/speed_of_light".

In the illustrated embodiments, the line 702 is representative of the function "slope=−center_frequency/time", or $\beta=-f_c/t$, where "center_frequency", $f_c$, is the mid frequency of the covered chirp bandwidth, "time", t, is the axis where to place the radar frame time window, and "slope", β, is the chirp slope across the time axis. As such, the line 702 includes two components: line 702-1 on the left side which produces positive slope values and line 702-2 on the right side which produces negative slope values. Each one of lines 702-1, 702-2 monotonically increase as the time (i.e., the x-axis value) increases. The chirp slope controller in the chirp generator (such as chirp generator 137 of FIG. 1) utilizes line 702-1 to generate positive slope values and utilizes line 702-2 to generate negative slope values.

In addition to using a function such as the one illustrated in FIG. 7 to generate the chirp slope values, the chirp slope controller in the chirp generator also utilizes a sampling time window and a sampling rate within the window to determine the chirp slope for each of the respective plurality of chirps in the radar sequence. One such sampling time window 704 used to generate positive sloped values is indicated on line 702-1. In addition, within the sampling time window 704, a series of sampling points 706 (one labeled for clarity) illustrate the slow-time sampling frequency, or sampling rate. In some embodiments, this slow-time sampling frequency or sampling rate is associated with the slow time sample period or interval described above in FIGS. 4-6. Thus, the chirp slope controller utilizes the combination of the function indicated by line 702-1, the sampling time window 704, and the sampling frequency within the window indicated by sampling points 706 to determine the positive chirp slopes for each of the plurality of chirps in the radar sequence such as the one illustrated in FIG. 4. The illustrated embodiment shows ten sampling points 706 for purposes of clarity, but alternative embodiments include other quantities of sampling points such as 32, 64, 128, 256, or other quantities that are determined based on a selected sampling rate or frequency within the sampling time window 704. Thus, depending on the number of chirps to be included in the radar frame over a given duration, the chirp slope controller is configured to adjust the sampling time window 704 and the sampling frequency within the window indicated by sampling points 706 accordingly. The slope values indicated by the sampling points increase (i.e., becomes steeper) over the sampling time window 704, which is consistent with the increasing slope magnitude of the positive slope chirps depicted in FIG. 4. In addition, the sampling time window 704 can be shifted along line 702-1 depending on the range of chirp slopes that are selected for the plurality of chirps in the radar frames.

FIG. 7 also shows an example of a second sampling time window 714 used to generate negative sloped values is indicated on line 702-2. In addition, within the second sampling time window 714, a series of sampling points 716 (one labeled for clarity) illustrate the slow-time sampling frequency or sampling rate. In some embodiments, this slow-time sampling frequency or sampling rate is associated with the slow time sample period or interval described above in FIGS. 4-6. Thus, the chirp slope controller utilizes the combination of the function indicated by line 702-2, the second sampling time window 714, and the sampling frequency within the window indicated by sampling points 716 to determine the negative chirp slopes for each of the plurality of chirps in the radar sequence such as the one illustrated in FIG. 5. The illustrated embodiment shows ten sampling points 716 for purposes of clarity, but alternative embodiments include other quantities of sampling points such as 32, 64, 128, 256, or other quantities that are determined based on a selected sampling rate or frequency within the second sampling time window 714. Thus, depending on the number of chirps to be included in the radar frame over a given duration, the chirp slope controller is configured to adjust the second sampling time window 714 and the sampling frequency within the second sampling time window indicated by sampling points 716 accordingly. The slope values indicated by the sampling points increase (i.e., becomes steeper) over the second sampling time window 714, which is consistent with the decreasing absolute value of the slopes of the negative slope chirps depicted in FIG. 5. In addition, the second sampling time window 714 can be shifted along line 702-2 depending on the range of chirp slopes that are selected for the plurality of chirps in the radar frames.

Figure 8:
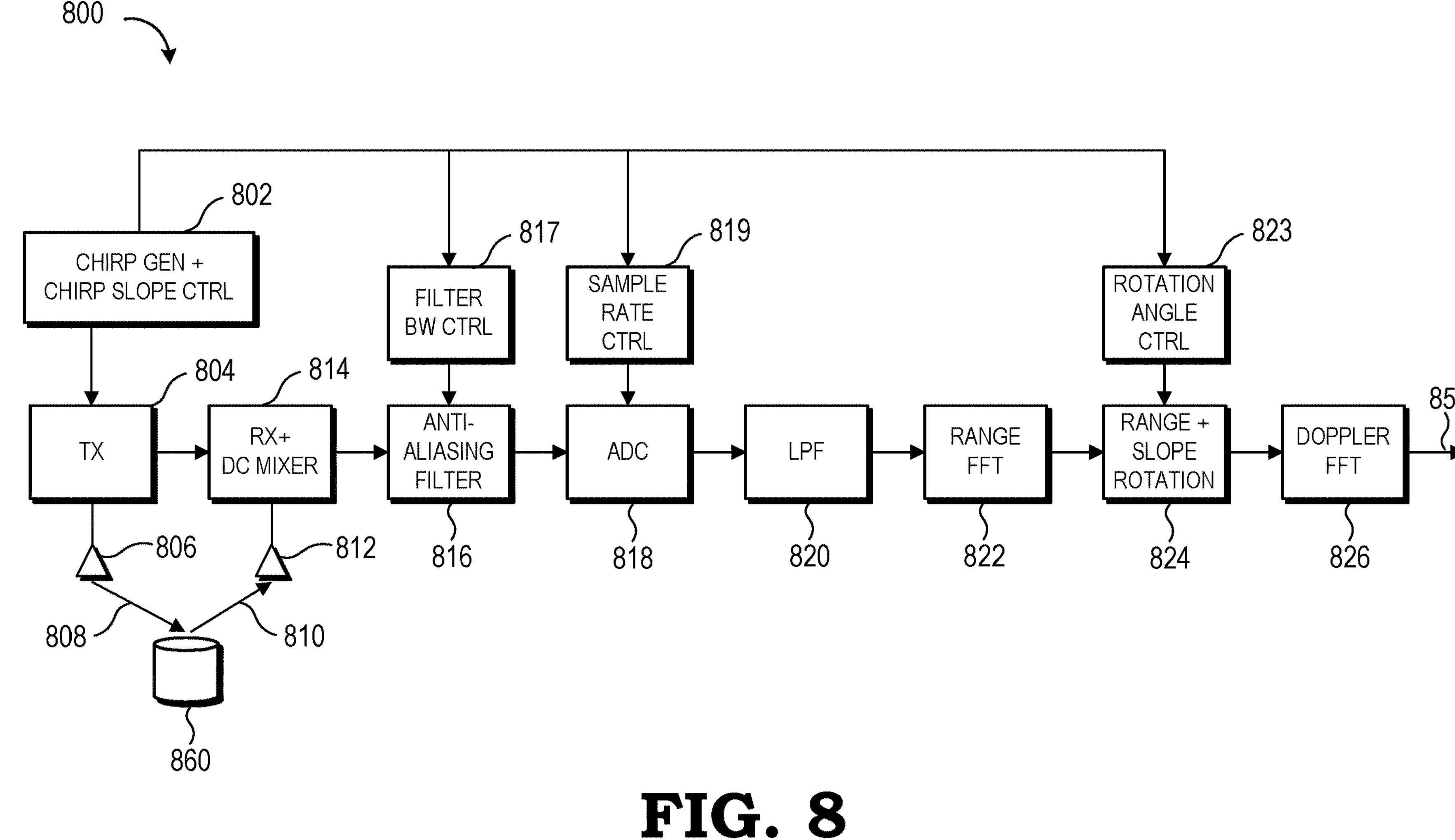
FIGS. 8 and 9 show different examples of a radar system, such as one corresponding to the radar system of FIGS. 1-3, having components to implement variable chirp slope modulation transmission and signal processing techniques, in accordance with various embodiments.

FIG. 8 shows an embodiment of a radar system 800 that implements radar chirp slope control and signal processing techniques. In some aspects, radar system 800 corresponds to radar system 100 of FIGS. 1 and 2. For example, the chirp generator including the chirp slope controller 802 in radar system 800 corresponds with the chirp generator 137 of radar system 100, the ADC 818 of radar system 800 corresponds to the ADC 122 of radar system 100, the Range FFT 822 of radar system 800 corresponds to the Fast-Time (Range) Spectrum 148 component of radar system 100, and the Doppler FFT 826 corresponds to the Slow-Time (Doppler) spectrum 152 component of radar system 100.

The chirp generator 802 includes a chirp slope controller to generate a radar sequence including a plurality of chirps that have different chirp slopes such as radar sequences 400, 500, and 600 of FIGS. 4, 5, and 6, respectively. Each one of the generated radar sequences is included in a radar frame of a series of radar frames that make up the radar signal 808 that is transmitted by the transmitter 804 via one or more transmit antennas 806. The transmitter 804 also sends the generated chirps of the radar sequence to the receiver for mixing with the received signal. After reflecting off of one or more objects 860, the reflected signal 810 is received by one or more receive antennas 812. The receiver 814 includes a down-converter that mixes the received reflected signal with the signal received from the transmitter 804 to generate a down-converted signal. Then, an analog anti-aliasing filter 818 filters the signal to restrict the bandwidth of the signal to satisfy the sampling of the signal over a particular frequency band. In this particular embodiment, the anti-aliasing filter 816 utilizes a filter bandwidth control parameter 817 that adjusts the filter bandwidth so that it is proportional to the chirp slope implemented by the chirp slope controller in the chirp generator 802. After being filtered by the anti-aliasing filter 816, the signal is converted to a digital signal by the ADC 818. In this particular embodiment, the sampling rate of the ADC 818 is controlled according to a sample rate control parameter 819 that is based on the chirp slope parameters from the chirp slope controller in the chirp generator 802. After being converted to digital samples, the signal is low-pass filtered at the LPF 820 to attenuate frequencies above a particular cut-off frequency in order to attenuate high beat frequencies and hence limit the supported maximum range. Then, the digital samples obtained from a single chirp are passed through a first fast Fourier transform (FFT) designated as the Range FFT 822 to generate data peaks according to the range (i.e., distance) of the reflection distances. The output of the Range FFT 822 is input to a Range and Slope Rotation component 824. The Range and Slope Rotation component 824 utilizes a rotation angle control parameter 823 based on the chirp slopes generated by the chirp slope controller of the chirp generator 802 to perform a range-specific and slope-specific complex rotation of the output of the Range FFT 822 to generate modified range FFT data samples, according to the equation $$r(\beta, f_b) = \exp\left(-j\pi f_b^2 / \beta\right),$$

where β is the respective chirp slope and $f_b$ is the distance-specific beat frequency. The modified range FFT data samples from all of the chirps are then passed through a second FFT designated as the Doppler FFT (or Velocity FFT) 826 per individual range bin. The Doppler FFT 826 generates the Doppler (or velocity) peaks based on the range FFT data samples across the plurality of chirps (i.e., in the slow-time), and outputs a range-Doppler map 850 that includes an array of complex values whose amplitude indicate the strength of possible reflections happening at a certain distance and with a certain relative velocity.

The embodiment of the radar system 800 shown in FIG. 8 leverage the feature that the chirp slope sampling frequency-related bandwidth is constant and varies the corresponding sampling frequency of the ADC 818 proportional to the chirp slope utilizing the sample rate control parameter 819. In addition, in some embodiments, the radar system 800 controls the anti-aliasing filter 816 using the filter bandwidth control parameter 817 before analog to digital conversion so that the bandwidth-limiting digital LPF 820 after the ADC 818 can utilize a fixed configuration without variation of the bandwidth.

Compared to a conventional radar system processing chain, the embodiment shown in FIG. 8 implements a variable chirp slope across the plurality of chirps that make up a radar frame. By implementing the filter bandwidth control parameter 817 at the anti-aliasing filter 816, the sample rate control parameter 819 at the ADC 818, and the rotation angle control parameter 823 at the range and slope rotation component 824, the radar system 800 generates a range-Doppler map 850 at the output of the Doppler FFT 826 that exhibits increased sensitivity and accuracy for objects moving at high radial velocity due to mitigating the effect of "range migration" that impact conventional radar systems.

Figure 9:
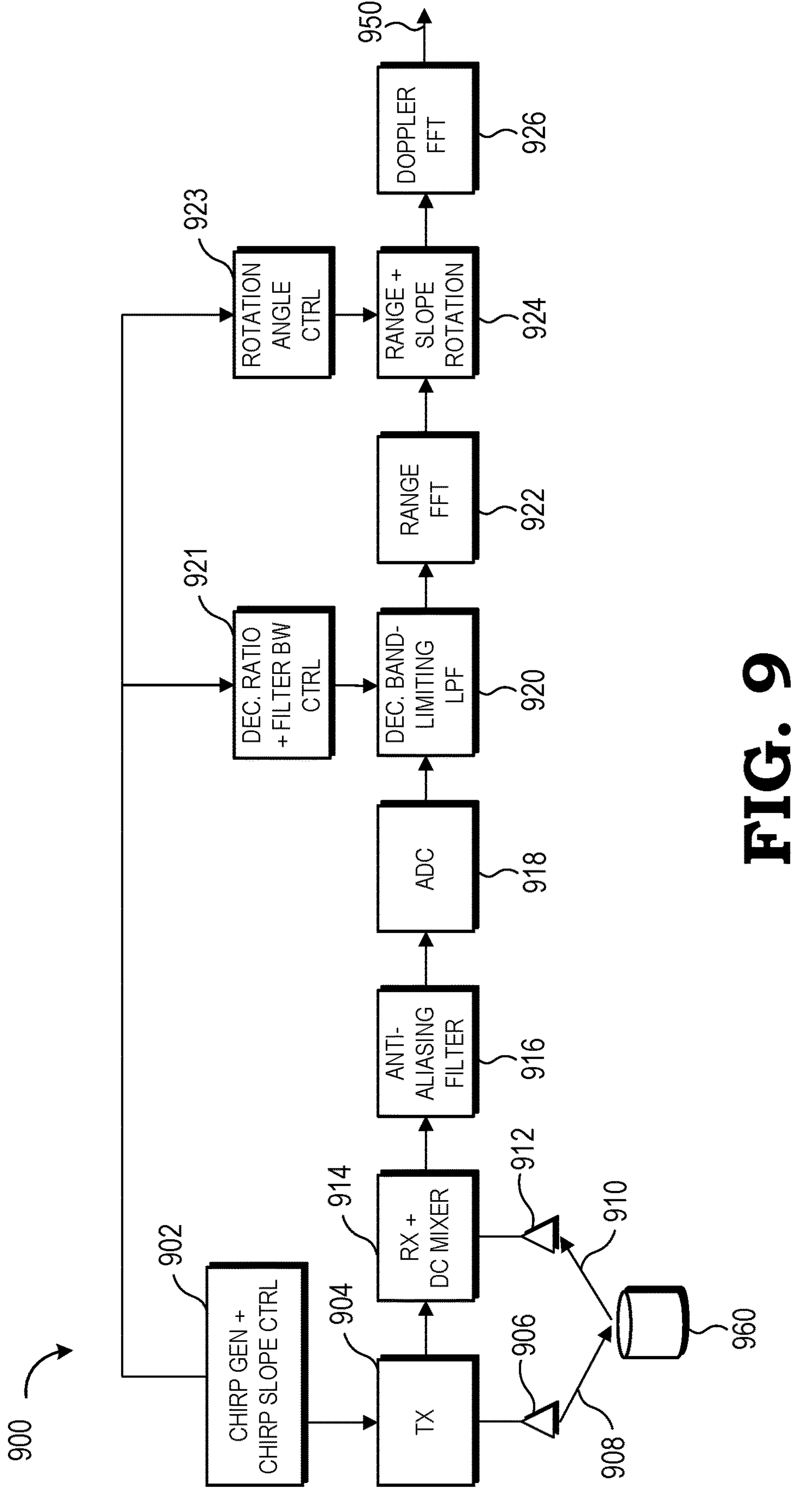

FIG. 9 shows another embodiment of a radar system 900 that implements radar chirp slope control and signal processing techniques. In some aspects, radar system 900 corresponds to radar system 100 of FIGS. 1 and 2. For example, the chirp generator including the chirp slope controller 902 in radar system 900 corresponds with the chirp generator 137 of radar system 100, the ADC 918 of radar system 900 corresponds to the ADC 122 of radar system 100, the Range FFT 922 of radar system 900 corresponds to the Fast-Time (Range) Spectrum 148 component of radar system 100, and the Doppler FFT 926 corresponds to the Slow-Time (Doppler) spectrum 152 component of radar system 100.

The chirp generator 902 includes a chirp slope controller to generate a radar sequence including a plurality of chirps that have different chirp slopes such as radar sequences 400, 500, and 600 of FIGS. 4, 5, and 6, respectively. Each one of the generated radar sequences is included in a radar frame of a series of radar frames that make up the radar signal 908 that is transmitted by the transmitter 904 via one or more transmit antennas 906. The transmitter 904 also sends the generated chirps of the radar sequence to the receiver for mixing with the received signal. After reflecting off of one or more objects 960, the reflected signal 910 is received by one or more receive antennas 912. The receiver 914 includes a down-converter that mixes the received reflected signal with the signal received from the transmitter 904 to generate a down-converted signal. Then, an analog anti-aliasing filter 918 filters the signal to restrict the bandwidth of the signal to satisfy the sampling of the signal over a particular frequency band. After being filtered by the anti-aliasing filter 916, the signal is converted to a digital signal by the ADC 918. After being converted to digital samples, the signal is low-pass filtered at the LPF 920 to attenuate frequencies above a particular cut-off frequency. In this particular embodiment, the LPF 920 is a decimating band-limiting LPF 920 that utilizes decimating ratio and filter bandwidth control parameters 921 that are based on the chirp slope parameters from the chirp slope controller in the chirp generator 902. Then, the digital samples obtained from a single chirp are passed through a first fast Fourier transform (FFT) designated as the Range FFT 922 to generate data peaks according to the range (i.e., distance) of the reflection distances. The output of the Range FFT 922 is input to a Range and Slope Rotation component 924. The Range and Slope Rotation component 924 utilizes a rotation angle control parameter 923 based on the chirp slopes generated by the chirp slope controller of the chirp generator 902 to perform a range-specific and slope-specific complex rotation of the output of the Range FFT 922 to generate modified range FFT data samples, according to the equation $$r(\beta, f_b) = \exp\left(-j\pi f_b^2 / \beta\right),$$

where $\beta$ is the respective chirp slope and $f_b$ is the distance-specific beat frequency. The modified range FFT data samples from all of the chirps are then passed through a second FFT designated as the Doppler FFT (or Velocity FFT) 926 per individual range bin. The Doppler FFT 926 generates the Doppler (or velocity) peaks based on the range FFT data samples across the plurality of chirps (i.e., in the slow-time), and outputs a range-Doppler map 950 that includes an array of complex values whose amplitude indicate the strength of possible reflections happening at a certain distance and with a certain relative velocity.

The embodiment of the radar system 900 shown in FIG. 9 targets minimizing changes in the analog domain compared with the embodiment shown in FIG. 8 and utilizes a fixed configuration for the anti-aliasing filter 916 and the ADC 918. In this particular embodiment, the decimating and band-limiting LPF 920 utilizes decimating ratio and filter bandwidth control parameters 921 to control the sampling frequency and the filter bandwidth in the digital domain. That is, a dedicated block implemented by hardware, software, or a combination thereof in the decimating and band-limiting LPF 920 controls the decimation ratio and the bandwidth of the data that passes through the filter to the Range FFT 922.

Compared to a conventional radar system processing chain, the embodiment shown in FIG. 9 implements a variable chirp slope across the plurality of chirps that make up a radar frame. By implementing the decimating ratio and filter bandwidth control parameters 921 at decimating and band-limiting LPF 920 and the rotation angle control parameter 923 at the range and slope rotation component 924, the radar system 900 generates a range-Doppler map 950 at the output of the Doppler FFT 926 that exhibits increased sensitivity and accuracy for objects moving at high radial velocity due to mitigating the effect of "range migration" that impact conventional radar systems.

Figure 10:
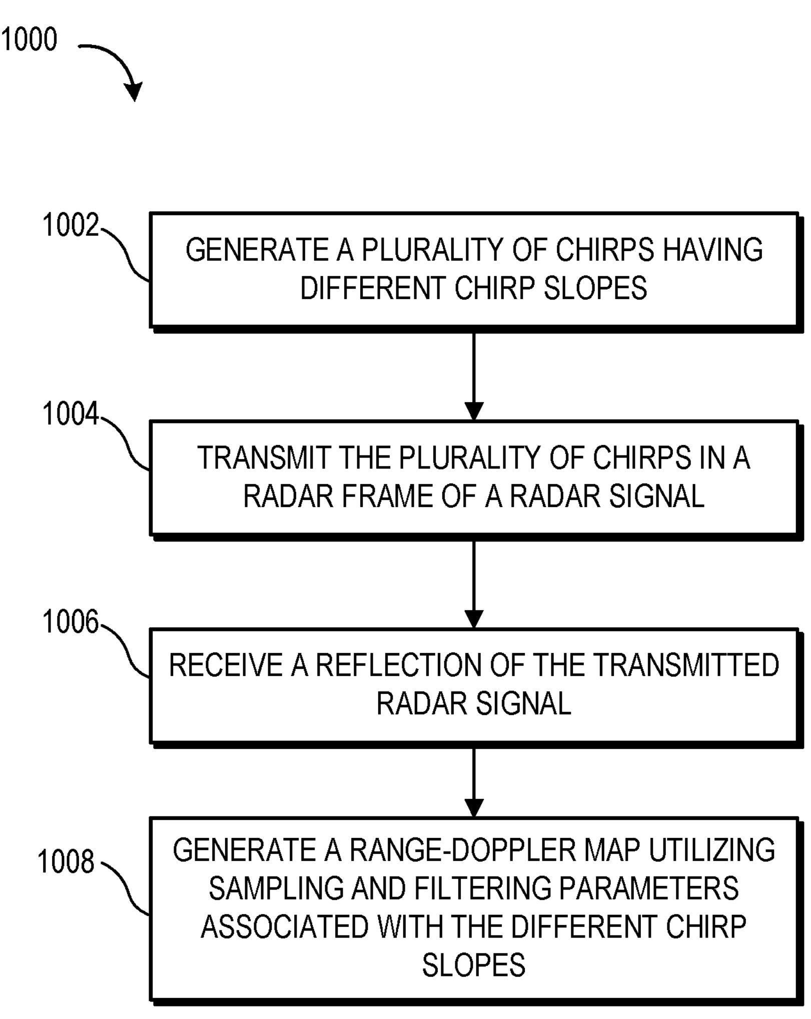
FIG. 10 shows an example of a method flowchart to execute variable chirp slope modulation transmission and signal processing techniques in accordance with various embodiments.

FIG. 10 shows a flowchart 1000 to execute variable chirp slope modulation transmission and signal processing techniques in accordance with various embodiments. The method shown in flowchart 1000 is implemented by a radar system such as one shown in FIGS. 1-3, 8, and 9 based on varying the chirp slopes of the plurality of chirps of a radar sequence in a radar frame as illustrated in FIGS. 4-7.

At 1002, the method includes a chirp generator (e.g., one of chirp generator 137 of FIG. 1, chirp generator with chirp slope controller 802 of FIG. 8, and chirp generator with chirp slope controller 902 of FIG. 9) generating a plurality of chirps having different chirp slopes. For example, the plurality of chirps includes chirps with chirp slopes as shown in any one of radar sequences 400, 500, 600 of FIGS. 4, 5, and 6, respectively.

At 1104, the method includes a transmitter (e.g., one of transmitter(s) 104 of FIG. 1, transmitter (TX) 804 of FIG. 8, transmitter (TX) 904 of FIG. 9) transmitting the plurality of chirps in a radar frame of a radar signal.

At 1106, the method includes a receiver (e.g., one of receiver(s) 110 of FIG. 1, receiver (RX) 814 FIG. 8, and receiver (RX) 914 of FIG. 9) receiving reflections of the radar signal after the radar signal reflects off of one or more objects.

At 1108, the method includes the radar system (e.g., one of radar system 100 of FIGS. 1 and 2, radar system 800 of FIG. 8, and radar system 900 of FIG. 9) generating a range-Doppler map (such as range-Doppler map 850, 950 of FIGS. 8 and 9, respectively) or range-Doppler data (such as range Doppler data 154 of FIG. 2) utilizing sampling and filtering parameters associated with the different chirp slopes of the chirps generated by the chirp generator. In some embodiments, the sampling and filtering parameters include one or more of the filter bandwidth control parameter 817, the sample rate control parameter 819, and the rotation angle control parameter 823 implemented by the components of FIG. 8. In other embodiments, the sampling and filtering parameters includes one or more of the decimating ratio and filter bandwidth control parameters 921 and the rotation angle control parameter 923 implemented by the components of FIG. 9.

In a first embodiment, a method includes generating a plurality of chirps. Each chirp of the plurality of chirps has a corresponding chirp slope, and chirp slopes of a first subset of the plurality of chirps monotonically vary from a first chirp of the first subset to a last chirp of the first subset. The chirp slope of each chirp is defined as a change in chirp frequency over a change in chirp duration. The method further includes transmitting the plurality of chirps during a radar frame.

In some aspects of the first embodiment, the first subset is equivalent to the plurality of chirps, and the chirp slope of each chirp of the plurality of chirps is positive. In some aspects, the chirp slope of the plurality of chirps monotonically increases over a duration of the radar frame.

In some aspects of the first embodiment, the first subset is equivalent to the plurality of chirps, and the chirp slope of each chirp of the plurality of chirps is negative. In some aspects, an absolute value of the chirp slope of the plurality of chirps monotonically decreases over a duration of the radar frame.

In some aspects of the first embodiment, the plurality of chirps includes a second subset different from the first subset. Chirps of the first subset alternate with chirps of the second subset, and chirp slopes of the first subset are positive and chirp slopes of chirps of the second subset are negative. In some aspects, a magnitude of the chirp slope of chirps of the first subset monotonically increases over a duration of the radar frame. In some aspects, a magnitude of the chirp slopes of chirps of the second subset monotonically decreases over a duration of the radar frame.

In some aspects of the first embodiment, the chirp slopes of each chirp of the plurality of chirps are determined based on a function that monotonically increases or decreases over an interval and based on a sampling frequency. For example, in some embodiments, the function is represented by the equation $\beta=-f_c/t$, where $\beta$ is the chirp slope, $f_c$ is a center frequency of a chirp bandwidth, and t is a time window of the radar frame.

In a second embodiment, a radar transmitter includes a radar chirp generator with a chirp slope controller configured to generate a plurality of chirps for transmission. Each chirp of the plurality of chirps has a corresponding chirp slope, and chirp slopes of a first subset of the plurality of chirps monotonically vary from a first chirp of the first subset to a last chirp of the first subset. The chirp slope is defined as a change in chirp frequency over a change in chirp duration of each chirp of the plurality of chirps. The radar transmitter also includes one or more transmit antennas to transmit the plurality of chirps during a radar frame.

In some aspects of the second embodiment, the first subset is equivalent to the plurality of chirps. The chirp slope controller is configured to control the chirp slope of each of the plurality of chirps to be positive, and the chirp slope of the plurality of chirps monotonically increases over the radar frame.

In some aspects of the second embodiment, the first subset is equivalent to the plurality of chirps. The chirp slope controller is configured to control the chirp slope of each of the plurality of chirps to be negative, and an absolute value of the chirp slope of the plurality of chirps monotonically decreases over the radar frame.

In some aspects of the second embodiment, the plurality of chirps includes a second subset different from the first subset. The chirp slope controller is configured to alternate chirps of the first subset with chirps of the second subset, and chirp slopes of the first subset are positive and chirp slopes of chirps of the second subset are negative. In some aspects, the chirp slope controller is configured to control a magnitude of the chirp slope of chirps of the first subset to monotonically increase over the radar frame, and the chirp slope controller is configured to control a magnitude of the chirp slopes of chirps of the second subset to monotonically decrease over the radar frame.

In some aspects of the second embodiment, the chirp slope controller is configured to determine the chirp slopes of each chirp of the plurality of chirps based on a function which monotonically increases or decreases over an interval and based on a sampling frequency.

In a third embodiment, a radar system includes a radar front end. The radar front end includes a chirp generator. The chirp generator is configured to generate a plurality of chirps for transmission, and each chirp of the plurality of chirps has a corresponding chirp slope. Chirp slopes of a first subset of the plurality of chirps monotonically vary from a first chirp of the first subset to a last chirp of the first subset, and the chirp slope is defined as a change in chirp frequency over a change in chirp duration of each chirp of the plurality of chirps. The radar front end also includes one or more transmit antennas to transmit the plurality of chirps during a radar frame and a radar receiver to receive reflections of the plurality of chirps and generate digital samples based on the reflections. The radar system also includes a radar processor to generate range and velocity data based on the digital samples.

In some aspects of the third embodiment, the radar processor includes a decimating lowpass filter configured to adjust a sampling frequency and filter bandwidth associated with the digital samples prior to performing range processing to generate range data based on the digital samples. In some aspects, the radar processor also includes a range-specific and slope-specific rotator to control a rotation angle of an output of the range processing and prior to performing velocity processing to generate velocity data based on the digital samples.

In some aspects of the third embodiment, the radar receiver includes an anti-aliasing filter to control a filter bandwidth of a signal based on the reflections and an analog-to-digital converter to vary a sampling rate of samples taken from an output of the anti-aliasing filter.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

generating a plurality of chirps of a radar sequence of a radar frame, each chirp of the plurality of chirps having a corresponding chirp slope, wherein chirp slopes of a first subset of the plurality of chirps monotonically vary from a first chirp of the first subset to a last chirp of the first subset, wherein the chirp slope of each chirp is defined as a change in chirp frequency over a change in chirp duration, wherein a number of chirps of the first subset is less than a number of chirps of the plurality of chirps of the radar sequence; and transmitting the plurality of chirps during the radar frame.

2. The method of claim 1, wherein the chirp slope of each chirp of the plurality of chirps is positive.

3. The method of claim 2, wherein the chirp slope of the first subset of the plurality of chirps monotonically increases over a duration of the radar frame.

4. The method of claim 1, wherein the chirp slope of each chirp of the plurality of chirps is negative.

5. The method of claim 4, wherein an absolute value of the chirp slope of the first subset of the plurality of chirps monotonically decreases over a duration of the radar frame.

6. The method of claim 1, wherein the plurality of chirps comprises a second subset different from the first subset, wherein chirps of the first subset alternate with chirps of the second subset, and wherein chirp slopes of the first subset are positive and chirp slopes of chirps of the second subset are negative.

7. The method of claim 6, wherein a first magnitude of the chirp slope of chirps of the first subset monotonically increases over a duration of the radar frame.

8. The method of claim 7, wherein a second magnitude of the chirp slopes of chirps of the second subset monotonically decreases over the duration of the radar frame.

9. The method of claim 1, wherein the chirp slopes of each chirp of the plurality of chirps are determined based on a function that monotonically increases or decreases over an interval and based on a sampling frequency.

10. The method of claim 9, wherein the function is represented by the equation $\beta=-f_c/t$, where $\beta$ is the chirp slope, $f_c$ is a center frequency of a chirp bandwidth, and t is a time window of the radar frame.

11. A radar transmitter comprising:

a radar chirp generator comprising a chirp slope controller configured to:

generate a plurality of chirps of a radar sequence for transmission during a radar frame, each chirp of the plurality of chirps having a corresponding chirp slope, wherein chirp slopes of a first subset of the plurality of chirps monotonically vary from a first chirp of the first subset to a last chirp of the first subset, wherein the chirp slope is defined as a change in chirp frequency over a change in chirp duration of each chirp of the plurality of chirps, wherein a number of chirps of the first subset is less than a number of chirps of the plurality of chirps of the radar sequence; and one or more transmit antennas to transmit the plurality of chirps during the radar frame.

12. The radar transmitter of claim 11, wherein the chirp slope controller is configured to control the chirp slope of each of the plurality of chirps to be positive, wherein the chirp slope of the first subset of the plurality of chirps monotonically increases over the radar frame.

13. The radar transmitter of claim 11, wherein the chirp slope controller is configured to control the chirp slope of each of the plurality of chirps to be negative, wherein an absolute value of the chirp slope of the first subset of the plurality of chirps monotonically decreases over the radar frame.

14. The radar transmitter of claim 11, wherein the plurality of chirps comprises a second subset different from the first subset, wherein the chirp slope controller is configured to alternate chirps of the first subset with chirps of the second subset, and wherein chirp slopes of the first subset are positive and chirp slopes of chirps of the second subset are negative.

15. The radar transmitter of claim 14, wherein the chirp slope controller is configured to control a magnitude of the chirp slope of chirps of the first subset to monotonically increase over the radar frame, and wherein the chirp slope controller is configured to control a magnitude of the chirp slopes of chirps of the second subset to monotonically decrease over the radar frame.

16. The radar transmitter of claim 11, wherein the chirp slope controller is configured to determine the chirp slopes of each chirp of the first subset of the plurality of chirps based on a function which monotonically increases or decreases over an interval and based on a sampling frequency.

17. A radar system comprising:

a radar front end comprising:

a chirp generator to generate a plurality of chirps of a radar sequence for transmission, each chirp of the plurality of chirps having a corresponding chirp slope, wherein chirp slopes of a first subset of the plurality of chirps have positive chirp slopes that monotonically vary from a first chirp of the first subset to a last chirp of the first subset, wherein chirp slopes of a second subset of the plurality of chirps have negative chirp slopes that monotonically vary across the second subset, wherein the chirp slope is defined as a change in chirp frequency over a change in chirp duration of each chirp of the plurality of chirps, the chirp generator is configured to alternate chirps of the first subset with chirps of the second subset;

one or more transmit antennas to transmit the plurality of chirps during a radar frame;

a radar receiver to receive reflections of the plurality of chirps and generate digital samples based on the reflections; and a radar processor to generate range and velocity data based on the digital samples.

18. The radar system of claim 17, wherein the radar processor comprises a decimating lowpass filter configured to adjust a sampling frequency and filter bandwidth associated with the digital samples prior to performing range processing to generate range data based on the digital samples.

19. The radar system of claim 18, wherein the radar processor comprises a range-specific and slope-specific rotator to control a rotation angle of an output of the range processing and prior to performing velocity processing to generate velocity data based on the digital samples.

20. The radar system of claim 17, wherein the radar receiver comprises an anti-aliasing filter to control a filter bandwidth of a signal based on the reflections and an analog-to-digital converter to vary a sampling rate of samples taken from an output of the anti-aliasing filter.

* * * * *